United States Patent [19]
Rose

[11] Patent Number: 5,574,468
[45] Date of Patent: Nov. 12, 1996

[54] PHASE-EQUIVALENT INTERFEROMETER ARRAYS

[75] Inventor: Conrad M. Rose, Dahlgren, Va.

[73] Assignee: Litton Systems, Inc., Woodland Hills, Calif.

[21] Appl. No.: 426,000

[22] Filed: Apr. 20, 1995

[51] Int. Cl.$^6$ .................................................. G01S 5/04
[52] U.S. Cl. ............................ 342/442; 342/424; 342/445
[58] Field of Search .................................. 342/424, 442, 342/444, 445

[56] References Cited

U.S. PATENT DOCUMENTS

4,387,376  6/1983  Sherrill et al. .
5,010,343  4/1991  Andersson ................................ 342/432

Primary Examiner—Theodore M. Blum
Attorney, Agent, or Firm—Gerald L. Lett

[57] ABSTRACT

A method is described modifying initially linear or planar interferometer arrays such that the arrays can be placed in conformal installations. The method commences with a conventional linear or planar array design and then using certain techniques and relationships allows for the possibility of antenna placement with materially reduced restrictions. A plurality of phase equivalent antenna locations obeying prescribed relationships are generated. These positions lie on the conformal surface on which the array is to be mounted. This permits an optimal set of antenna positions to be chosen based on operational requirements.

6 Claims, 5 Drawing Sheets

$$\phi_i = 2\pi \frac{d_i}{\lambda} \sin\theta \,(\text{mod}\, 2\pi) \quad i = 1,2,3,4$$

PHASE-EQUIVALENT INTERFEROMETER ARRAYS

BACKGROUND OF THE INVENTION

This invention relates generally to phase comparison interferometer arrays utilized in the directional characterization, or direction finding, of radio frequency (RF) emitters from an observational platform. More particularly, the invention relates to the arrangement or placement of antennas in such arrays.

Interferometry is a technique for determining the direction of arrival of plane wave radio frequency signals by measuring signal path length differences from the plane wave source to two or more receiving antennas. The characterization of the r.f. signal as "plane wave" requires that the distance to the source is much greater than the distance between antennas, so the rays incident on the antennas are parallel. When this is true the observing platform is said to be in the far field of the emitter.

Antenna arrays in such devices must perform the direction finding (DF) with the needed accuracy, which requires a large spacing between the antennas. But this large spacing leads to ambiguous emitter angle-of-arrival information. Resolving the latter ambiguities requires the addition of antenna elements at precise relative antenna locations to control the gross error rate. Moreover, precise placement of the antenna elements in an interferometer array is difficult to achieve on many observational platforms, such as aircraft.

With the observer in the emitter's far field, the signals received in pairs of the interferometer's precisely placed antennas can be phase-compared and the relative phase shift will depend only on the angle-of-arrival, or AOA, and the number of signal wavelengths between the two antennas. The relationship between measured phase and AOA on the ith baseline is $$\phi_i = \left( \frac{2\pi}{\lambda} \vec{d}_i \cdot \vec{u} \right)_{mod(2\pi)} + \epsilon_\phi \qquad 1$$

or $$\phi_i = \frac{2\pi}{\lambda} d_i \sin(\theta) - 2\pi n + \epsilon_\phi \qquad 2$$

where $\vec{u}$ is the direction-of-arrival or DOA unit vector, i.e. the signal wave normal, $\theta$ the AOA, and $\vec{d}_i$ is the vector from one antenna element to the other, subsequently referred to simply as the ith baseline. The integer n is the "ambiguity integer", and represents the number of equally possible AOA's corresponding to the measured phase. This number is a function of both the emitter signal wavelength $\lambda$ and interferometer baseline length $d_i$, e.g. if the inequality $$-\frac{\lambda}{2d} \leq \sin(\theta) < \frac{\lambda}{2d} \qquad 3$$

is satisfied, n is equal to 0 and a unique value of measured $\phi_i$ may be associated with a single $\theta$. Equation 3 shows the unambiguous field-of-view, or FOV is inversely proportional to the baseline length. Practical systems have measurement error $\epsilon_\phi$, as indicated in Equation 1, and this produces an AOA error $$\sigma_{AOA} = \frac{\epsilon_\phi \lambda}{2\pi d \cos(\theta)} \qquad 4$$

also inversely proportional to the baseline length. Equation 3 and Equation 4 establish the basic problem of interferometer design: obtaining an accurate angle estimate over a wide field-of-view given that increasing angle measurement accuracy causes the unambiguous FOV to contract.

This problem of obtaining accurate and unambiguous emitter AOA is often solved by adding additional antennas in a location collinear with the first pair. Such an antenna array is called a linear interferometer. By comparing the phase measurements made between the multiple pairs of antennas the unique AOA can be found. The process of converting multiple AOA ambiguous phase measurements into the unique, correct AOA is known as "ambiguity resolution", and performing this resolution incorrectly results in a "gross error". Linear interferometers using three or more antennas to resolve ambiguity are described in U.S. Pat. No. 3,631,496 by Fink, Burnham and Marks, and also in U.S. Pat. No. 3,852,754 by Worrell.

Robert L. Goodwin, in "Ambiguity-Resistant Three and Four—Channel Interferometers", (NRL Report 8005 Sep. 9, 1976) demonstrates that the gross error rate across the field-of-view is best controlled in linear interferometers when the antenna element spacings consist of certain integer multiples of a greatest common divisor of the antenna spacings, $d_0$, where $$d_0 = \frac{\lambda_{hf}}{2} \sin(AOA_{FOV})^{-1} \qquad 5$$

In this equation $\lambda_{hf}$ is the signal wavelength at the highest frequency of interest, and $AOA_{FOV}$ the angular field-of-view desired.

In many phase interferometer applications direction-of-arrival, or DOA is required. DOA provides elevation and azimuth to the emitter, rather than simply the AOA cone the emitter may lie on. DOA cannot typically be provided by a single linear array in current systems, but requires noncolinear antenna elements. U.S. Pat. No. 4,638,320 by Eggert et. al. describes a class of four element interferometers with the antennas located such that two of the array baselines are orthgonal. Each baseline provides an AOA, and the two AOA cones can be intersected to get the DOA. Such an array necessarily has antenna elements that lie in a plane. Furthermore, these multiple antenna elements must bear a precise relationship to one another to control the interferometer gross error rate, as taught by N. Malloy in his 1983 IEEE ICASSP paper "Analysis and Synthesis of General Planar Interferometer Arrays". In this paper, Malloy extended Goodwin's analysis for linear arrays with a method of interferometer design applicable to both linear and planar antenna element placement, i.e the generation of both AOA and DOA. His technique utilizes the design constraints of frequency range of operation, field-of-view required, DF accuracy needed, maximum gross error rate allowed, and interacts these with the backplane available for antenna placement to determine the number of antenna elements, their diameters and the precise relative locations that must be used. For both linear and planar designs the antenna elements are separated by integer spacings (FIG. 1a, 50), which is critical in obtaining the same gross error rate at all frequencies and AOA's of interest. Thus in Malloy's approach, the multiple baselines and phase measurements given by $$\begin{bmatrix} \phi_1 \\ \phi_2 \\ \cdot \\ \cdot \\ \phi_n \end{bmatrix} = \frac{2\pi}{\lambda} \begin{bmatrix} \vec{d}_1 \\ \vec{d}_2 \\ \cdot \\ \cdot \\ \vec{d}_n \end{bmatrix} \vec{u} + 2\pi \vec{n} + \vec{\epsilon}_\phi \qquad 6.a$$

or

-continued $$\vec{\phi} = \frac{2\pi}{\lambda} D^t \vec{u} + 2\pi \vec{n} + \vec{\epsilon} \quad \text{(6.b)}$$

have baselines designed such that $$D^s = PT^t \quad \text{(7)}$$

where p is an array of integers and T is a matrix analogous to $d_\phi$ in the Goodwin approach. Intrinsic to Malloy's method is the existence of another integer matrix B such that $$BP^s = \vec{0} \quad \text{(8)}$$

Generating suitable antenna placements, or $D^t$, such that the most appropriate integer matrices P, and B result is a complex process.

Other design approaches include that of W. B. Kendall, "Unambiguous Accuracy of an Interferometer Angle-Measuring System," IEEE Trans. SET-11.62-70 (June 1965). This approach may not achieve the uniform gross error rate across the field-of-view intrinsic to the Malloy approach.

This approach, as described in the literature, and other well-established linear and planar design techniques, does not generate arrays using antenna elements mounted on curved surfaces. They are concerned with the precise placement of antenna elements on a common ground plane. This is a significant drawback for two reasons. The aircraft surfaces the interferometer is mounted on are generally curved to reduce drag and increase structural integrity. Use of a common ground plane means planar or linear interferometer designs must be mounted behind curved radomes. These radomes have broadband r.f. transmission limitations that cause them to be major sources of phase measurement error. Antenna manufacturing techniques have advanced to the production of elements that fit conformably to the surface they are mounted on, thus eliminating the need for radomes.

Also, when applying these established design techniques to interferometers mounted on aircraft, it is frequently difficult to find space to place the antennas in their required precise relative positions. For this reason compromise is typically made that degrades FOV, DF accuracy, gross error rate or other significant performance requirements. The desired DOA accuracies are typically not achieved because of constraints on antenna size and number.

SUMMARY OF THE INVENTION

An object of the invention is to reduce the restriction on antenna placement in an interferometer array required to provide the needed accuracy and gross error rate across a wide field-of-view.

A further object of the invention is to extend techniques for designing and implementing linear and planar arrays to conformal installations, in particular installations on curved surfaces that do not require radomes.

Another object of the invention is to provide for the installation of existing array designs on specific platforms, where such installation is not feasible without the implementation modifications previously described.

Other objects of the invention include improving the DF accuracy or the gross error rate performance of linear and planar array designs while not requiring a change in the fundamental design methods.

The invention provides a technique that alleviates the need to make the detrimental compromises described hereinabove by providing the possibility of allowing antenna placement with materially reduced restrictions. It permits the use of existing design techniques for linear and planar arrays to be used while not requiring the conventional restrictions related to antenna size, number and backplane area available for placement.

The invention also provides an efficient and flexible means to combine the implementation of short baseline interferometers (SBI) with long baseline interferometers (LBI). Such LBI/SBI systems, as described in Kaplan, U.S. Pat. No. 4,734,702 and Rose et al, U.S. Pat No. 5,343,212, are important, when not just DF, but also emitter location are required.

DETAILED DESCRIPTION OF THE PREFERRED EMBODIMENTS

The interferometer design and implementation approach of this invention comprise generating a dispersed array of phase-equivalent interferometer baselines taking advantage of the prior art techniques described above. This baseline dispersion is possible because the interferometer operates in the emitter's far field, and hence the signal has a plane wave phase front. The significance of this for the invention is described below.

Figure 1A:
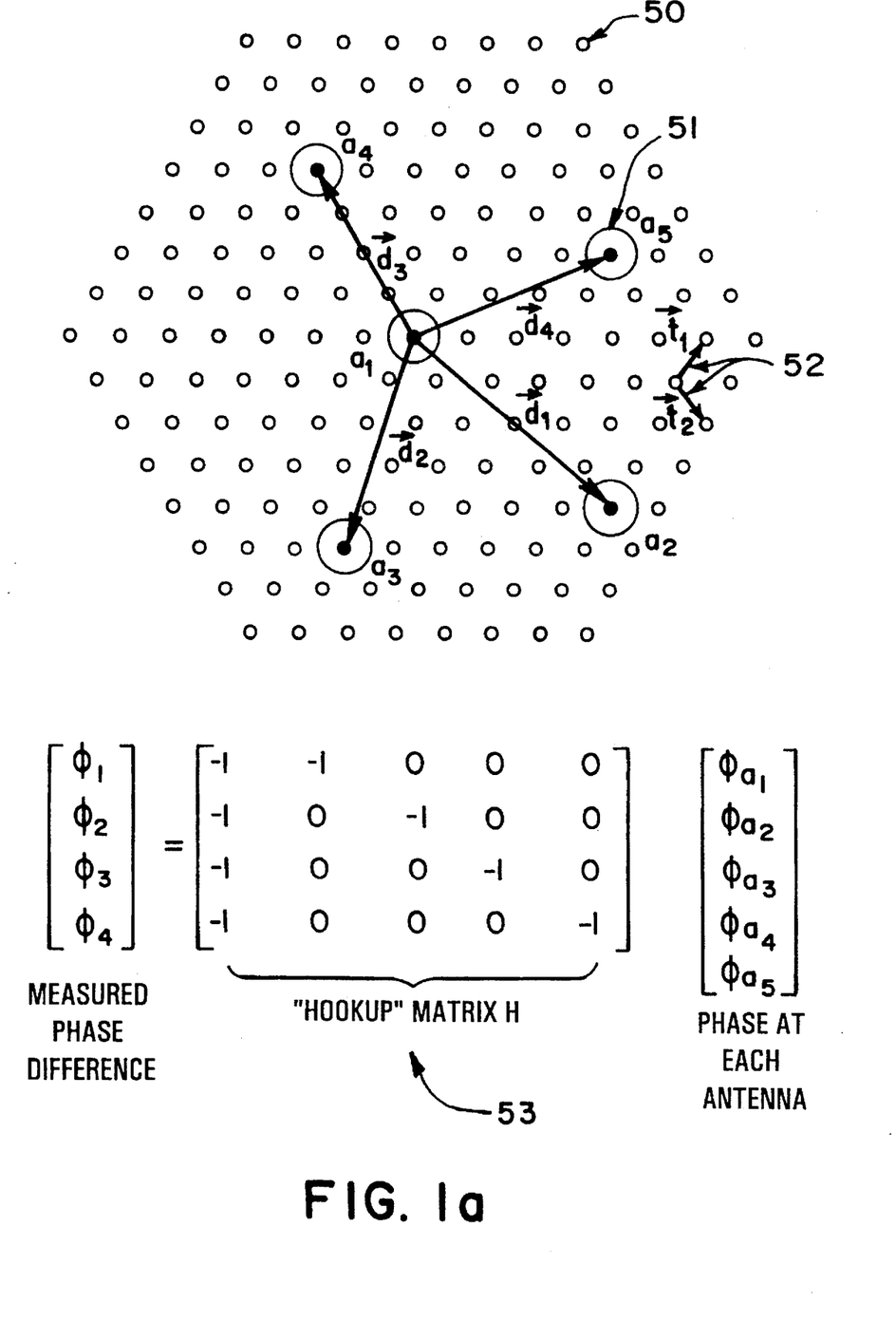
FIG. 1a illustrates schematically a conventional planar array design using a prior art approach.

The conventional baseline is formed by choosing one antenna element as the reference antenna and measuring the phase between it and a second antenna. The location of the antennas in the conventional system is given by establishing a coordinate system whose origin in the conventional array is fixed with respect to the platform on which the antennas are mounted, as indicated in FIG. 1, (described below). Hence each baseline in the conventional array is referenced to the same coordinate system origin. This invention alters that. It changes the origin of the reference coordinate system for some subset, and possibly all, of the array baselines.

Thus the reference antenna for the ith baseline $\vec{d}_i$ whose position is $\vec{a}_1$ in the conventional implementation, is now at location $\vec{a}_{01} + \vec{a}_1$, while the second antenna completing the baseline is at $\vec{a}_{02} + \vec{a}_2$ where $\vec{a}_{02}$ is a vector to the line with Pluecker coordinates (see e.g. Brand, *Vector Analysis*, John Wiley and Sons, 1957) ($\vec{d}_i, \vec{a}_{01} \vec{d}_1$) such that $$(\vec{a}_{02} - \vec{a}_{01}) \times \vec{d}_1 = 0 \quad \text{(9.a)}$$

and $$|\vec{a}_{02} - \vec{a}_{01}| = |\vec{d}_1| \quad \text{(9.b)}$$

The set of all antenna positions ($\vec{a}_{01}+\vec{a}_1$, $\vec{a}_{02}+\vec{a}_2$) satisfying Equation 9 are phase-equivalent in the sense that in the emitter's far-field the same phase difference is measured across them. Therefore an array consisting of a complete set of baselines, but having dispersed antennas satisfying Equation 9, will be subsequently referred to as a phase-equivalent array. If no phase measurement noise were present, phase measurements made on the dispersed array would be indistinguishable from phase measurements made on the conventional array for a plane wave signal. But phase measurement noise is always present in practical systems, and manipulating its effect forms an intrinsic part of this invention, as described below.

The implementation of a phase-equivalent version of an interferometer designed according to the techniques of Malloy has the following characteristics. Since the phase difference measured on each baseline does not change, Equation (6.a) does not change, i.e D is the same for the dispersion of the baselines from the original set, and hence the other matrix quantities that determine the array, i.e. P, T and B are unchanged. But the phase-equivalent dispersed array implementation is altered from the conventional array design both in the fact that antennas not forming an antenna-pair baseline can be located anywhere relative to each other, and by the requirement to thus use more antenna elements. A consequence of this change in the number of antennas needed to implement the array is that the channel-to-channel phase error correlation, and hence the performance, of the dispersed array is different; i.e. its DOA accuracy and gross error rate change from the equivalent conventional implementation.

Figure 1B:
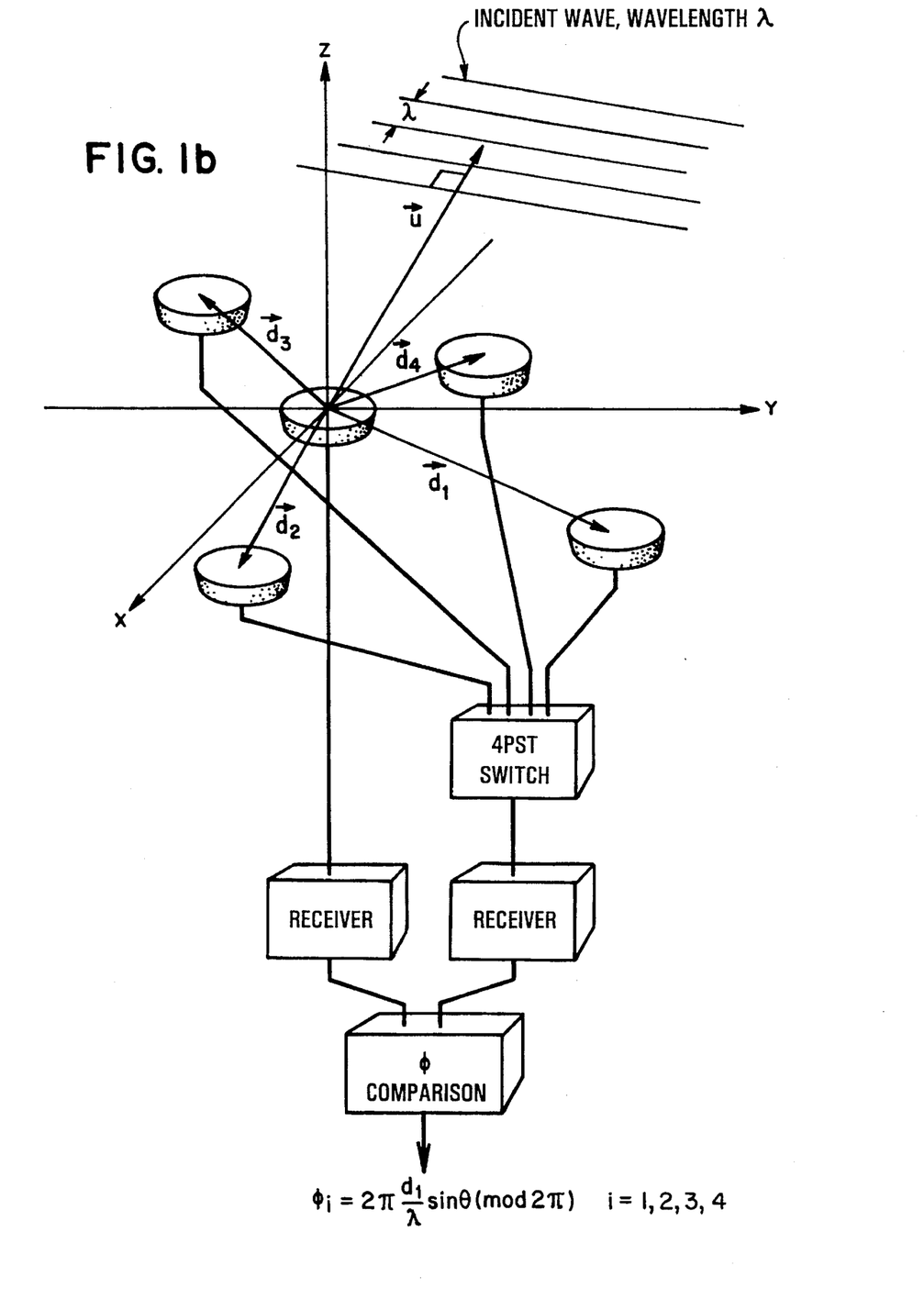
FIG. 1b is a schematic/perspective view showing a typical implementation of the FIG. 1a prior art array.
Figure 2A:
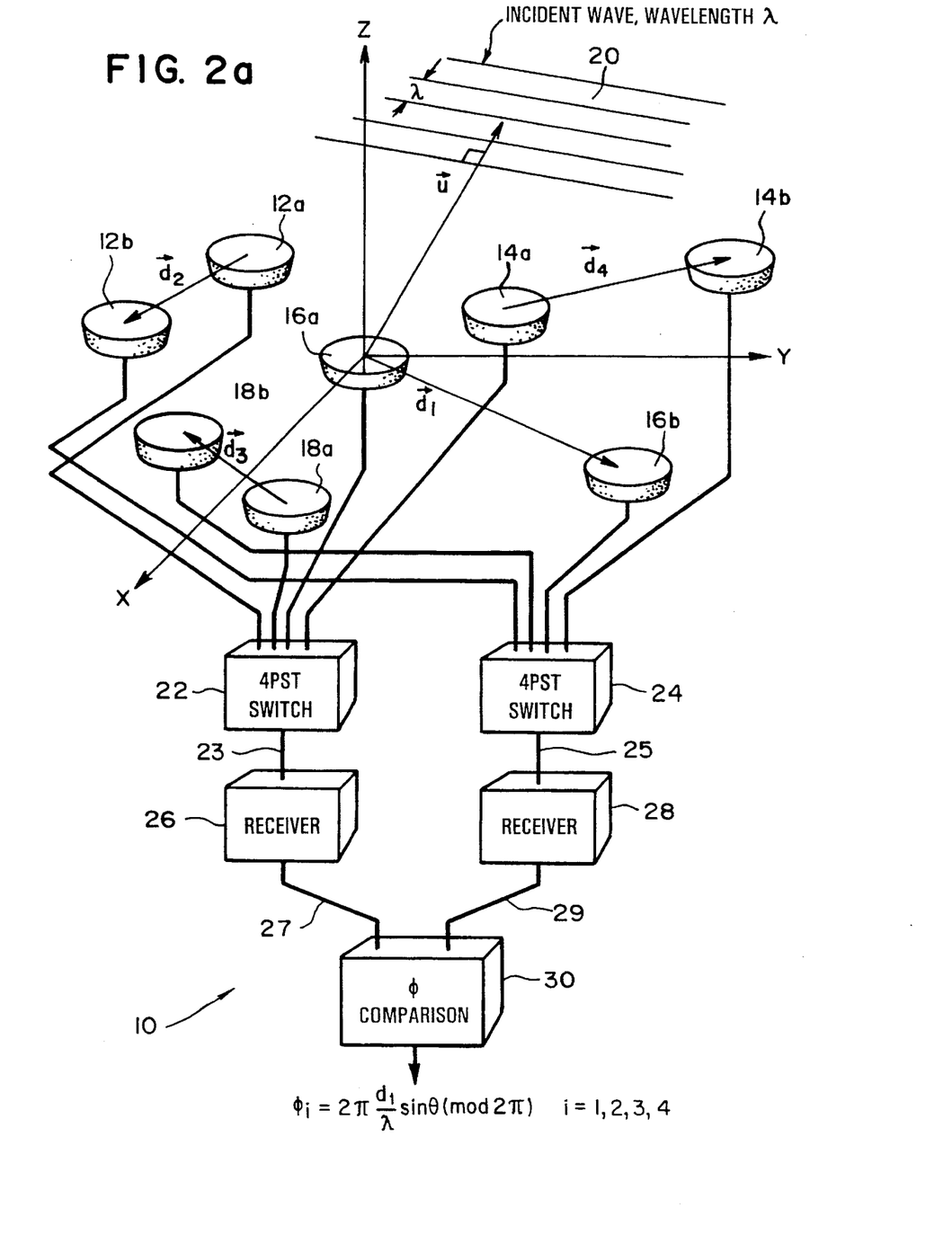
FIG. 2a is a schematic/perspective view of a phase-equivalent dispersed interferometer array constructed according to the principles of the invention from the FIG. 1 array.

FIG. 1b illustrates in schematic form a conventional planar interferometer, while FIG. 2a illustrates a preferred embodiment of a phase dispersed interferometer array 10 based on the array of FIG. 1 according to the invention. The antenna elements do not lie in a common plane, nor do they maintain the spacings dictated by the prior art, where the prior art is illustrated by FIG. 1a.

The antenna elements 12, 14, 16 and 18 are arranged in a noncoplanar fashion to receive the plane wave 20 from a distant emitter-to-be-located (not shown). By means of illustrated connecting lines the respective antenna elements 12a, 14a, 16a and 18a are connected to 4PST switch 22, and likewise, the antenna elements 12b, 14b, 16b and 18b are connected to 4PST switch 24. The lines 23 and 25, respectively, connect switches 22 and 24 to receivers 26 and 28, respectively. The detected signals from the receivers are supplied via lines 27 and 29 to phase comparator 30 which supplies the phase information needed to arrive at DOA of the signal from the emitter being located.

Figure 2B:
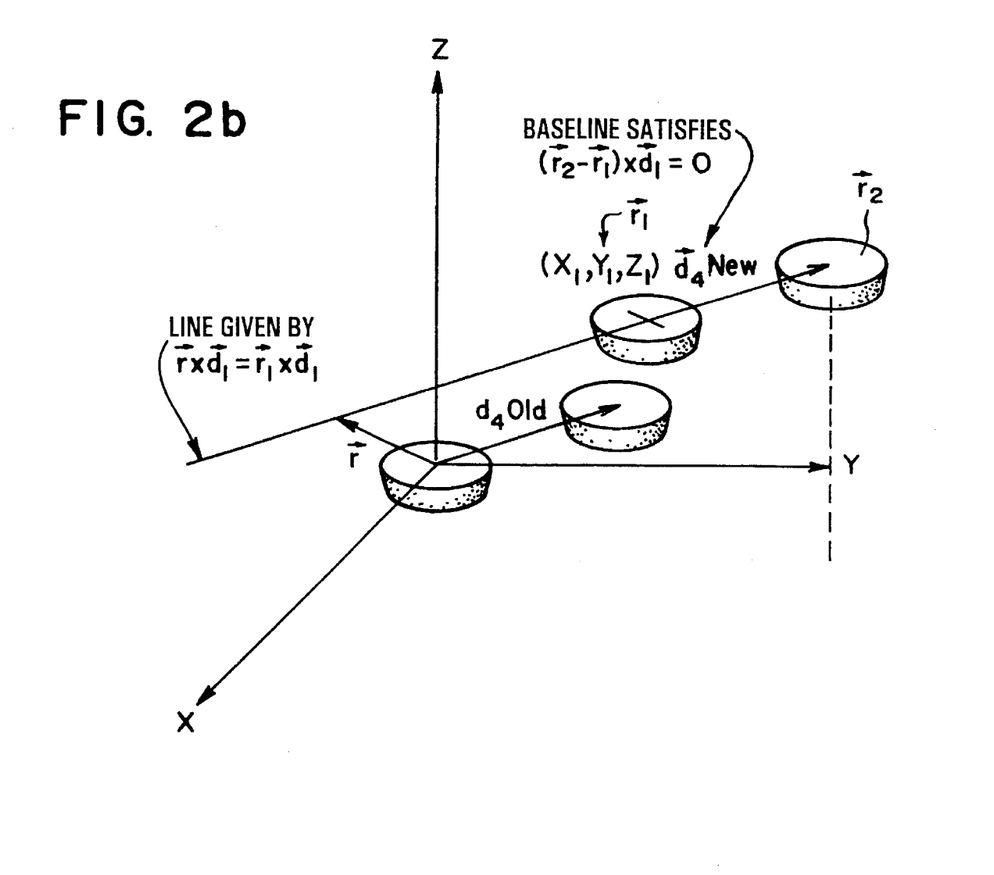
FIG. 2b illustrates how the new baselines of the FIG. 2a array are formed from the conventional FIG. 1a array.

As illustrated in FIG. 2b, the baselines of the original FIG. 1b array are displaced so that they lie on lines parallel to the original corresponding baseline. The Pluecker coordinates described above provide a convenient means to define the set of all lines parallel to a given baseline.

Using the design method taught by Malloy, which is the preferred conventional method to use because of its performance optimality and precise analytical prediction of that performance, it is known the resulting array, such as the array shown in FIG. 1, satisfies the following constraint equation involving determinants of the matrix quantities characterizing the design:

$$|(PR^{-1}P^t)^{-1}| = |BRB^t|^{-1}|R|. \quad\quad 10$$

where R is the phase measurement error covariance equation, i.e.

$$R = E(\vec{\epsilon}_\phi \vec{\epsilon}_{100}^{\,t}) \quad\quad 11)$$

As noted above, dispersing the array baselines causes R to change, and hence the gross error rate, which varies as $|BRB^t|$ and DOA accuracy, which is proportional to $|PR^{-1}P^t|$.

The error matrix changes as follows. The error covariance matrix R is typically made up of three components: phase mistracks between the antenna channels forming one baseline, phase calibration errors and phase detector errors. The formation of the dispersed array directly affects the correlation of phase mistrack errors. It does this in a way that, as predicted by Equation 10, changes the gross error rate, and in inverse proportion, changes the DOA accuracy. That is, the gross error rate can be either increased or decreased over the conventional implementation, with a corresponding change in DOA accuracy such that Equation 10 is satisfied. This is illustrated next.

The change in the error covariance matrix R occurring in the implementation of the dispersed array depends on the number of additional antennas required. In the conventional design the number of antenna elements $N_a$ is related to the number of baselines B by $$N_a = B+1 \quad\quad 12(a)$$

while in the dispersed array, the number of antenna elements satisfies the inequality $$B+1 < N_a \leq 2B \quad\quad 12(b)$$

To each different value of $N_a$ satisfying this equation there corresponds a different R, and hence different gross error rate and DOA accuracy. The nature of this relationship is made precise through the use of phase "hookup" matrices H (FIG. 1a), where H (FIG. 1a, 53) is defined as the transformation relating antenna positions as columns in a matrix A, referenced in a three dimensional coordinate system to the array baseline matrix D, i.e $$D = HA$$

The entries of H are thus either 1, −1, or 0. If the channel to channel phase errors $\epsilon_\phi$ are the same for all baselines, the error variance can be given in terms of H by $$R = HH^t \frac{\sigma_{\epsilon_\phi}^2}{2} \quad\quad 13$$

where the calibration and detection errors are neglected, since they are essentially the same in all installations considered here. Then in going from the conventional co-planar array of FIG. 1, to the phase-equivalent dispersed array, as shown in FIG. 2, only H changes in the performance equations. The physical consequence of the change in H is discussed next.

The physical consequence is best seen by considering the effect of two extreme cases: dispersing the shortest baselines, or dispersing the longest baselines. Dispersing the shortest subbaselines yields the minimum gross error rate phase-equivalent array, but also provides the minimum AOA accuracy; while the implementation using the longest sub-baselines gives the maximum gross error rate but best AOA performance.

It is easiest to illustrate this with a four antenna element linear array. A conventional linear array designed according to the teachings of Goodwin and Malloy has antennas spaced by relatively prime integer multiples of $d_o$ (Equation 5). In this example the integer multiples are 9, 3, and 4. The P, B, and T matrices describing the array are then:

$$P = \begin{bmatrix} 9 \\ 12 \\ 16 \end{bmatrix}$$

while $$B^t = \begin{bmatrix} 4 & 0 \\ -3 & 4 \\ 0 & -3 \end{bmatrix}$$

and, from the constraint of 900 FOV at 18 GHz,

T=0.3281

T has the dimension inches. The phase measurements "hookup" matrix relating antennas $a_i$ with baselines dj, is, for the conventional array

|       | $a_1$ | $a_2$ | $a_3$ | $a_4$ |
|-------|-------|-------|-------|-------|
| $d_1$ | 1     | -1    | 0     | 0     |
| $d_2$ | 1     | 0     | -1    | 0     |
| $d_3$ | 1     | 0     | 0     | -1    | with corresponding $$R = \begin{bmatrix} 1 & .5 & .5 \\ .5 & 1 & .5 \\ .5 & .5 & 1 \end{bmatrix} \sigma^2_{\epsilon_\phi}$$

It is possible to form the dispersed array using only the shortest baselines. The hookup matrix for the short subbaseline dispersed array is

|       | $a_1$ | $a_2$ | $a_3$ | $a_4$ | $a_5$ | $a_6$ |
|-------|-------|-------|-------|-------|-------|-------|
| $d_1$ | 1     | -1    | 0     | 0     | 0     | 0     |
| $d_2$ | 1     | -1    | 1     | -1    | 0     | 0     |
| $d_3$ | 1     | -1    | 1     | -1    | 1     | -1    | so $$R = \begin{bmatrix} 1 & 1 & 1 \\ 1 & 2 & 2 \\ 1 & 2 & 3 \end{bmatrix} \sigma^2_{\epsilon_\phi}$$

If the longest baselines are used in the dispersed array the hookup matrix is

|       | $a_1$ | $a_2$ | $a_3$ | $a_4$ | $a_5$ | $a_6$ |
|-------|-------|-------|-------|-------|-------|-------|
| $d_1$ | 1     | -1    | 0     | 0     | 0     | 0     |
| $d_2$ | 0     | 0     | 1     | -1    | 0     | 0     |
| $d_3$ | 0     | 0     | 0     | 0     | 1     | -1    | and $$R = \begin{bmatrix} 1 & 0 & 0 \\ 0 & 1 & 0 \\ 0 & 0 & 1 \end{bmatrix} \sigma^2_{\epsilon_\phi}$$

Table I (attached) shows the predicted performance from Equation 10 for these different values of R. The short subbaseline array has an improved gross error rate, but worse AOA accuracy than the conventional array, and vice versa for the long subbaseline distributed array.

As indicated by this example, in a prior art linear array, if one of the dispersed baselines is the longest baseline, the DOA accuracy may actually improve, while the gross error rate increases somewhat over the collocated array. This may require the addition of antennas to reduce the gross error rate, although the signal processing algorithms would not change, and the design procedure for the new array is the same as for the old. On the other hand, if short subbaselines form the displaced baselines, the gross error rate can improve, although DOA accuracy is reduced.

The use of dispersed short subbaselines to synthesize longer phase-equivalent baselines is an important aspect of this invention, and its use is not limited to arrays designed according to the prior art methods as illustrated next.

Figures 3A, 3B:
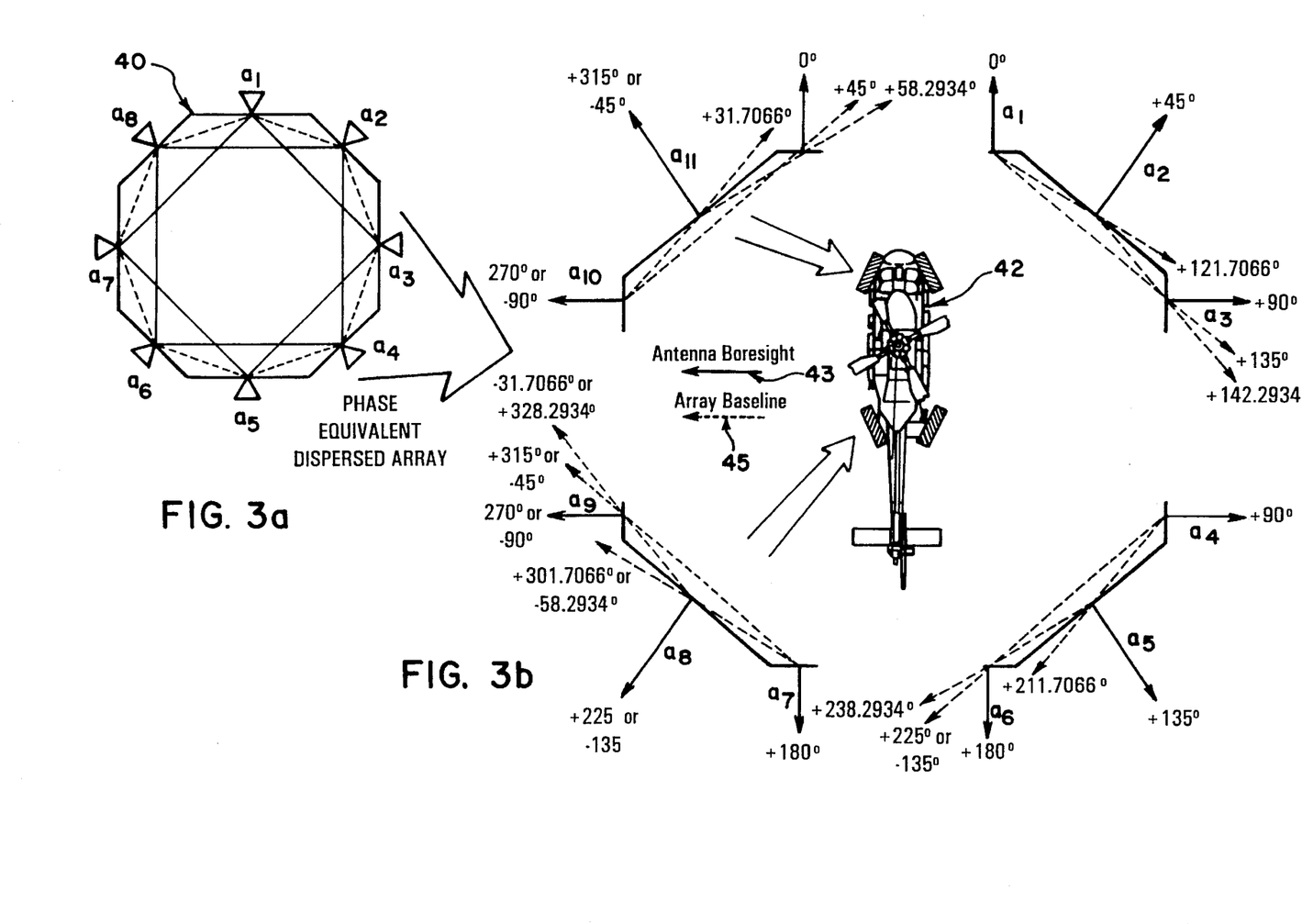
FIG. 3a is a plan view of a hexagonal phase equivalent array designed using a conventional approach.
FIG. 3b is a further plan view of the FIG. 3a embodiment illustrating a specific application of it on a helicopter according to the invention.

FIG. 3a shows a hexagonal array 40 of antennas A1–A8, as might be used on a helicopter 42 (FIG. 3b). The boresite for the array on the helicopter is at 43, and the array baseline is indicated by arrow 45. The phase ambiguities on the all the baselines shown are resolved using amplitude DF. The hexagonal design is used to get a 360° field-of-view for helicopter surveillance. However it will not physically fit as a unit on the helicopter. But the antennas can be moved in accordance with the Pluecker constraints, resulting in the dispersed implementation shown. The phase-equivalent implementation does not have quite the 360° FOV of the original array because of the blockage created by the helicopter's tail. Note that the longest baselines, e.g. between antennas $a_2$ and $a_4$ in the original array, are synthesized by dispersed subbaselines, such as $a_2$–$a_3$ and $a_4$–$a_5$ in the phase-equivalent implementation.

Since, unlike the arrays designed using the Goodwin or Malloy approaches amplitude, and not phase is used to resolve the interferometer ambiguities in this helicopter array, there is no essential change in performance between the conventional and dispersed hexagonal arrays. But when the prior art approach is used, there are also many cases where the original design need not be changed because of the improvement in the phase error budget with the dispersed array obtained by dispensing with the need for radomes.

It is also preferred that the conventional array be a planar array. Implementation of the dispersed equivalent of a planar array can greatly improve performance while requiring the addition of only two antennas, as shown by the dispersed "triad" example presented next.

Two dispersed arrays from the conventional planar array, such as the array of FIG. 1, may be constructed from the conventional planar array design. To illustrate this, assume all three arrays are characterized by the relatively prime integer spacings $$P = \begin{bmatrix} -17 & -4 \\ -7 & 7 \\ 9 & 18 \\ 15 & 16 \\ 13 & 3 \\ 3 & -13 \end{bmatrix}$$

$$B = \begin{bmatrix} 2 & 3 & 0 & 1 \\ 2 & -5 & -2 & 0 \\ -1 & 1 & -3 & -1 \\ 1 & 0 & 3 & -2 \\ 3 & 1 & -2 & 5 \\ 1 & -2 & -2 & -3 \end{bmatrix}$$

and $$T = \begin{bmatrix} 0.2602 & -0.4228 \\ -0.3379 & -0.0564 \end{bmatrix}$$

The last array has the dimension inches.

Assume the conventional implementation has antennas located in sensor coordinates according to:

|     | x       | y       |
| --- | ------- | ------- |
| $a_1$ | 1.9834  | 2.8733  |
| $a_2$ | 3.2846  | 1.1836  |
| $a_3$ | 1.4966  | −3.1543 |
| $a_4$ | −0.8778 | −3.0985 |
| $a_5$ | −3.2846 | −1.1836 |
| $a_6$ | −2.9923 | 1.4637  |
| $a_7$ | −1.2362 | 2.8161  |

These locations give an unambiguous field-of-view of 900 at 16 GHz.

The conventional array has the hookup matrix

|     | $a_1$ | $a_2$ | $a_3$ | $a_4$ | $a_5$ | $a_6$ | $a_7$ |
| --- | --- | --- | --- | --- | --- | --- | --- |
| $d_1$ | 1 | −1 | 0 | 0 | 0 | 0 | 0 |
| $d_2$ | 1 | 0 | −1 | 0 | 0 | 0 | 0 |
| $d_3$ | 1 | 0 | 0 | −1 | 0 | 0 | 0 |
| $d_4$ | 1 | 0 | 0 | 0 | −1 | 0 | 0 |
| $d_5$ | 1 | 0 | 0 | 0 | 0 | −1 | 0 |
| $d_5$ | 1 | 0 | 0 | 0 | 0 | 0 | −1 | with corresponding measurement errors $$R = \begin{bmatrix} 1 & .5 & .5 & .5 & .5 & .5 \\ .5 & 1 & .5 & .5 & .5 & .5 \\ .5 & .5 & 1 & .5 & .5 & .5 \\ .5 & .5 & .5 & 1 & .5 & .5 \\ .5 & .5 & .5 & .5 & 1 & .5 \\ .5 & .5 & .5 & .5 & .5 & 1 \end{bmatrix} \sigma_{\epsilon_\phi}^2$$

Triads of antenna elements forming two baselines are used in the dispersed implementation. For the dispersed array, these triads determine the plane the antennas are mounted on. The phase-equivalent array thus involves three parallel planes with the triads lying anywhere on those planes (one triad per plane) with the baselines for each triad maintaining the same angle relative to the baselines of the other triads given by original design. One implementation of the triads is such that the antennas spaced furthest apart are used for an LBI. Thus although two extra antennas are required to implement the dispersed phase-equivalent SBI, the overall SBI/LBI implementation requires no additional antennas over the conventional approach.

The antenna locations in the triad array used to generate performance are

|     | X        | Y        | Z       |
| --- | -------- | -------- | ------- |
| $a_1$ | 13.9141  | 8.3210   | 20.4520 |
| $a_2$ | 3.2847   | 1.1832   | 0       |
| $a_3$ | −14.7713 | −31.2455 | 17.8117 |
| $a_4$ | 11.0523  | 2.3501   | 20.452  |
| $a_5$ | −19.5523 | −29.2750 | 17.8117 |
| $a_6$ | −2.9923  | 1.4637   | 0       |
| $a_7$ | −17.5035 | −25.2756 | 17.8117 |
| $a_8$ | 8.6455   | 4.2647   | 20.4520 |
| $a_9$ | −0.8781  | −3.0982  | 0       |

The hookup matrix for the SBI is

|     | $a_1$ | $a_2$ | $a_3$ | $a_4$ | $a_5$ | $a_6$ | $a_7$ | $a_8$ | $a_9$ |
| --- | --- | --- | --- | --- | --- | --- | --- | --- | --- |
| $d_1$ | 1 | −1 | 0 | 0 | 0 | 0 | 0 | 0 | 0 |
| $d_2$ | 1 | 0 | −1 | 0 | 0 | 0 | 0 | 0 | 0 |
| $d_3$ | 0 | 0 | 0 | 1 | −1 | 0 | 0 | 0 | 0 |
| $d_4$ | 0 | 0 | 0 | 1 | 0 | −1 | 0 | 0 | 0 |
| $d_5$ | 0 | 0 | 0 | 0 | 0 | 0 | 1 | −1 | 0 |
| $d_6$ | 0 | 0 | 0 | 0 | 0 | 0 | 1 | 0 | −1 |

The measurement noise covariance matrix is then $$R = \begin{bmatrix} 1 & .5 & 0 & 0 & 0 & 0 \\ .5 & 1 & 0 & 0 & 0 & 0 \\ 0 & 0 & 1 & .5 & 0 & 0 \\ 0 & 0 & .5 & 1 & 0 & 0 \\ 0 & 0 & 0 & 0 & 1 & .5 \\ 0 & 0 & 0 & 0 & .5 & 1 \end{bmatrix} \sigma_{\epsilon_\phi}^2$$

A second example of the preferred implementation of this approach is the dispersion of each separate baseline in the original design. The antenna locations in the array used to generate this "single" baseline performance are:

|     | X        | Y        | Z       |
| --- | -------- | -------- | ------- |
| $a_1$    | 20.1231  | 40.5512  | 10.6889 |
| $a_2$    | 17.3909  | 46.5211  | 20.6889 |
| $a_3$    | −25.9213 | −30.1330 | 12.5332 |
| $a_4$    | −30.7023 | −28.1625 | 17.1232 |
| $a_5$    | 0        | 0        | 0       |
| $a_6$    | −5.2686  | −4.0563  | 2.1100  |
| $a_7$    | −50.2220 | 39.1612  | 5.0174  |
| $a_8$    | −53.0838 | 33.1903  | 8.0174  |
| $a_9$    | −12.2348 | −15.1765 | 2.0310  |
| $a_{10}$ | −10.1206 | −19.7384 | 7.010   |
| $a_{11}$ | 12.2348  | 15.1765  | −2.0310 |
| $a_{12}$ | 18.5118  | 14.8960  | −4.1310 |

The hookup matrix is then

|     | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ |
| --- | --- | --- | --- | --- | --- | --- | --- | --- | --- | --- | --- | --- |
| $d_1$ | 1 | −1 | 0 | 0 | 0 | 0 | 0 | 0 | 0 | 0 | 0 | 0 |
| $d_2$ | 0 | 0 | 1 | −1 | 0 | 0 | 0 | 0 | 0 | 0 | 0 | 0 |
| $d_3$ | 0 | 0 | 0 | 0 | 1 | −1 | 0 | 0 | 0 | 0 | 0 | 0 |
| $d_4$ | 0 | 0 | 0 | 0 | 0 | 0 | 1 | −1 | 0 | 0 | 0 | 0 |
| $d_5$ | 0 | 0 | 0 | 0 | 0 | 0 | 0 | 0 | 1 | −1 | 0 | 0 |
| $d_6$ | 0 | 0 | 0 | 0 | 0 | 0 | 0 | 0 | 0 | 0 | 1 | −1 | which gives $$R = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \sigma_{\epsilon_\phi}^2$$

The single baseline dispersed array requires five more antennas than the conventional array. The advantage it offers over the triad implementation is ease of conformal installation on a curved surface.

Table II (attached) shows the predicted performance from Equation 14 for these three different values of H. Both dispersed designs have a worse gross error rate, but improved AOA accuracy over the conventional array for the same phase error. The single baseline implementation achieves the best DOA performance, and the worse gross error rate. The triad version is the most desirable for achieving a low gross error rate while simultaneously requiring the fewest additional antennas, but is more restrictive in antenna placement than the dispersed single baseline implementation.

In implementing these arrays in a typical system, the overall system error budget changes as shown in Table III (attached). This Table is generic in nature, and represents the magnitude and type of errors incurred in current ESM systems, but is not specific to any one system. Table III indicates an improvement of about 4.5° degrees in the system phase error for both dispersed designs. This improvement comes from eliminating the radome, and increasing the antenna element diameters. The improvement is greater than the degradation due to the addition of a switch, as shown in FIG. 2a. When these changes are taken into account, the DOA performance of both new implementations is an improvement over the conventional design. In particular, the triad implementation gives a dramatic improvement in gross error rate.

In summary, this invention associates with each conventional interferometer design a class of associated arrays having dispersed baselines. The preferred conventional array is one based on the design techniques outlined by Malloy in his 1983 ICASSP paper referenced above. The conventional and dispersed arrays are then each characterized by a "zero-one" array H relating antenna elements to phase measurements. H predicts the relative performance of the different arrays in the set according to Equation 10, which may be manipulated to give $$|P^t(HH^t)^{-1}P| \approx |B^t(HH^t)B||(HH^t)^{-1}| \qquad 14$$

where now $|P^t(HH^t)^{-1}P|^{-1}$ is proportional to DOA accuracy, while $|B^t(HH^t)B|$ is proportional to the gross error rate. H depends on the number of antenna elements $N_a$ used to implement the various arrays. For the conventional array $N_a$ is given by Equation (12a) while for the set of dispersed arrays $N_a$ satisfies Equation (12b).

Equation 14 shows that in going from the conventional design to a phase-equivalent implementation, although the physical spacing of sets of the antennas may change dramatically, the performance only changes because of the different measurement error correlations.

The principles of the invention are described hereinabove in relation to certain preferred embodiments. These embodiments may be modified or changed while remaining within the scope of the invention as defined by the appended claims.

I claim:

1. A method for modifying conventional linear and planar interferometer arrays for installation on a conformal surface, comprising the steps of:

designing a conventional linear or planar interferometer array, choosing a dispersed set of baselines on the basis of said conventional linear or planar array design and in accordance with the particular conformal surface installation, changing the value of phase measurement noise for the conventional linear or planar array design so that it is consistent with a value for said dispersed set of baselines, and generating a multiplicity of phase equivalent antenna locations from the specific antenna positions of the conventional design which consists, for a particular baseline $a_1$ and arbitrary origin change $a_0$, of the set of all antenna positions $a_0$ and $a_1$ on a line with Pluecker coordinates $(\vec{d}_p, \vec{d}_0 \times \vec{d}_t)$ such that $$|\vec{a}_1 - \vec{a}_0| = |\vec{d}_1|.$$

2. The method described in claim 1 comprising the additional steps of:

generating the Pluecker coordinates for said dispersed baselines such that predetermined gross error and DOA accuracy criteria are met, testing different sets of dispersed baselines such that an error variance R is varied according to $$R = E(\vec{\epsilon}_\phi \vec{\epsilon}_\phi^t)$$

$$R = HH^t \frac{\sigma_{\epsilon_\phi}^2}{2}$$

choosing the optimal phase equivalent set such that minimum gross error rate or maximum DOA accuracy are achieved.

3. The method described in claim 2 where a conventional linear or planar array is used as the basis for generating dispersed phase equivalent arrays, and hence the error variance used initially is that of the conventional linear or planar array.

4. The method described in claim 1 where additional antenna elements are used to form said dispersed array thereby forming an ambiguous long baseline interferometer suitable for use in long baseline interferometer, or LBI, passive ranging.

5. The method described in claim 2 where the DOA accuracy or the gross error rate is improved over the conventional linear or planar array comprising the additional steps of:

moving the interferometer baselines apart to form said dispersed baselines such that larger diameter antennas can be used, thus improving the gross phase error rate and conformably mounting the antennas so that no radome is needed.

6. The method of claim 1 where the phase measured across a single baseline in the conventional linear or planar array is synthesized by adding two or more phase measurements across separate baselines in said dispersed array.

* * * * *